United States Patent
Hasegawa et al.

(10) Patent No.: US 9,692,058 B2
(45) Date of Patent: Jun. 27, 2017

(54) ELECTRODE FOR FUEL CELL AND PRODUCTION METHOD OF ELECTRODE FOR FUEL CELL, MEMBRANE ELECTRODE ASSEMBLY AND FUEL CELL

(75) Inventors: Shigeki Hasegawa, Sunto-gun (JP); Shigeaki Murata, Numazu (JP); Masahiro Imanishi, Gotemba (JP); Ryoichi Namba, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 94 days.

(21) Appl. No.: 14/417,951

(22) PCT Filed: Aug. 2, 2012

(86) PCT No.: PCT/JP2012/004911
§ 371 (c)(1),
(2), (4) Date: Jan. 28, 2015

(87) PCT Pub. No.: WO2014/020650
PCT Pub. Date: Feb. 6, 2014

(65) Prior Publication Data
US 2015/0180047 A1    Jun. 25, 2015

(51) Int. Cl.
H01M 4/96  (2006.01)
H01M 4/86  (2006.01)
H01M 4/90  (2006.01)
H01M 4/88  (2006.01)
(Continued)

(52) U.S. Cl.
CPC ....... *H01M 4/9083* (2013.01); *H01M 4/8663* (2013.01); *H01M 4/8828* (2013.01); *H01M 4/8882* (2013.01); *H01M 4/9041* (2013.01); *H01M 8/1004* (2013.01); *H01M 2008/1095* (2013.01); *H01M 2300/0082* (2013.01)

(58) Field of Classification Search
None
See application file for complete search history.

(56) References Cited

U.S. PATENT DOCUMENTS

| | | | |
|---|---|---|---|
| 2005/0090387 | A1 | 4/2005 | Niihara et al. |
| 2010/0075201 | A1* | 3/2010 | Nakanishi ........... H01M 4/8657 429/434 |
| 2012/0100463 | A1 | 4/2012 | Hasegawa |

(Continued)

FOREIGN PATENT DOCUMENTS

| | | |
|---|---|---|
| CN | 101405908 A | 4/2009 |
| JP | 2004-074116 A | 3/2004 |

(Continued)

OTHER PUBLICATIONS

English translation of JP2010027574 (2010).*

*Primary Examiner* — Yoshitoshi Takeuchi
(74) *Attorney, Agent, or Firm* — Andrews Kurth Kenyon LLP

(57) ABSTRACT

This electrode for fuel cell comprises: carbon nanotubes; a catalyst for fuel cell supported on the carbon nanotubes; and an ionomer provided to coat the carbon nanotubes and the catalyst for fuel cell, wherein when a length of the carbon nanotubes is represented by La [μm] and an inter-core pitch of the carbon nanotubes is represented by Pa [nm], the length La and the inter-core pitch Pa satisfy two expressions given below: $30 \leq La \leq 240$; and $0.351 \times La + 75 \leq Pa \leq 250$.

12 Claims, 12 Drawing Sheets

(51) Int. Cl.
*H01M 8/1004* (2016.01)
*H01M 8/1018* (2016.01)

(56) References Cited

U.S. PATENT DOCUMENTS

2013/0288152 A1  10/2013  Hasegawa
2014/0154608 A1   6/2014  Nonoyama et al.

FOREIGN PATENT DOCUMENTS

| JP | 2004-127737 | A | 4/2004 | | |
|----|----|----|----|----|----|
| JP | 2007-257886 | A | 10/2007 | | |
| JP | 2008-059841 | A | 3/2008 | | |
| JP | 2009-140764 | A | 6/2009 | | |
| JP | 2010-027574 | A | 2/2010 | | |
| JP | 2010027574 | | * 2/2010 | ............. | H01M 4/86 |
| JP | 2010-218820 | A | 9/2010 | | |
| JP | 2010-225433 | A | 10/2010 | | |
| JP | 2010-272437 | A | 12/2010 | | |
| JP | 2012-089378 | A | 5/2012 | | |
| JP | 2012-133917 | A | 7/2012 | | |
| WO | 99/65821 | A1 | 12/1999 | | |
| WO | 2006/080702 | A1 | 8/2006 | | |
| WO | 2012/098640 | A1 | 7/2012 | | |

\* cited by examiner $\tau = Lb/La$

ELECTRODE FOR FUEL CELL AND PRODUCTION METHOD OF ELECTRODE FOR FUEL CELL, MEMBRANE ELECTRODE ASSEMBLY AND FUEL CELL

CROSS-REFERENCE TO RELATED APPLICATION

This is a national phase application based on the PCT International Patent Application No. PCT/JP2012/004911 filed Aug. 2, 2012, the entire contents of which are incorporated herein by reference.

TECHNICAL FIELD

The present invention relates to an electrode used in fuel cell.

BACKGROUND ART

A known fuel cell uses carbon nanotubes (CNT) for electrodes (for example, Patent Literature 1). Patent Literature 1 discloses a fuel cell comprising a fibrous conductive carrier, a catalyst supported on the surface of the fibrous conductive carrier and a solid polymer electrolyte coating the surface of the catalyst. When R (nm) represents a fiber radius of the fibrous conductive carrier, A (/nm$^2$) represents a fiber density of the fibrous conductive carrier per unit electrode area and L (nm) represents a fiber length of the fibrous conductive carrier, an electrode for fuel cell is defined to satisfy the following four expressions:

$R>1$ nm $L<20000$ nm $1-A\pi R^2>0.5$ $2\pi RLA>200$

CITATION LIST

Patent Literature

[PTL1] JP2009-140764 A

SUMMARY OF INVENTION

Technical Problem

The prior art structure, however, has a less number of sites on the carbon nanotubes where the metal catalyst is supported. This decreases the amount of the metal catalyst supported and results in a problem of insufficient output power. A possible measure of increasing the number of sites on the carbon nanotubes where the metal catalyst is supported may increase the length of the carbon nanotubes or may increase the number density of the carbon nanotubes (number of carbon nanotubes per unit area). An excessive increase in length of the carbon nanotubes or an excessive increase in number density of the carbon nanotubes may, however, make the carbon nanotubes likely to be pressed and blocked by gas diffusion layers in a stack of fuel cells and may deteriorate the gas diffusivity or the drainage to reduce the voltage. The excessive increase may also cause the carbon nanotubes not to be compressed under application of a load and increase the distance between the electrolyte membrane and the catalyst for fuel cell where power generation occurs, thus deteriorating the proton conductivity to reduce the voltage. As the result of exclusive study under various conditions, the inventors of the present application have found that the power generation characteristic of the fuel cell is improved under a certain relationship of the inter-core pitch (or density per unit area) and the length of the carbon nanotubes. With respect to a fuel cell using the carbon nanotubes for electrodes, the inventors have also found that using the carbon nanotube electrode has the better effect of the increased solubility of oxygen in an ionomer than using a carbon particle electrode.

Solution to Problem

In order to achieve at least part of the foregoing, the present invention provides various aspects described below.

(1) According to one aspect of the invention, there is provided an electrode for fuel cell. This electrode for fuel cell comprises: carbon nanotubes; a catalyst for fuel cell supported on the carbon nanotubes; and an ionomer provided to coat the carbon nanotubes and the catalyst for fuel cell, wherein when a length of the carbon nanotubes is represented by La [μm] and an inter-core pitch of the carbon nanotubes is represented by Pa [nm], the length La and the inter-core pitch Pa satisfy two expressions given below: $30 \leq La \leq 240$; and $0.351 \times La + 75 \leq Pa \leq 250$. Even when a fuel cell including this electrode for fuel cell is compressed by application of a load, the electrode for fuel cell of this aspect makes pores between the carbon nanotubes less likely to be blocked and suppresses deterioration of gas diffusivity or drainage of water produced, thus improving the power generation characteristic. This also keeps the sufficiently small distance between the electrolyte membrane and the catalyst for fuel cell where power generation occurs and thus ensures the good proton conductivity.

(2) The electrode for fuel cell according to the aspect before, wherein the length La and the inter-core pitch Pa may satisfy an expression may be given below: $0.708 \times La + 59.3 \leq Pa \leq 250$. The electrode for fuel cell of this aspect further improves the power generation characteristic of the fuel cell.

(3) The electrode for fuel cell according to the aspects before, wherein the length La and the inter-core pitch Pa may satisfy an expression given below: $30 \leq La \leq 120$, and $0.611 \times La + 82.5 \leq Pa \leq 1.333 \times La + 190$. Fuel cells using the electrode for fuel cell are stacked and are compressed under application of a load. The electrode for fuel cell of this aspect shortens the distance between the electrolyte membrane and the catalyst for fuel cell where power generation occurs by compression. This keeps the good proton conductivity from the electrolyte membrane through the ionomer in the electrode to the catalyst for fuel cell and thereby improves the power generation characteristic of the fuel cell.

(4) The electrode for fuel cell according to the aspects before, wherein the length La and the inter-core pitch Pa may satisfy an expression given below: $0.78 \times La + 78 \leq Pa \leq 1.333 \times La + 190$. The electrode for fuel cell of this aspect further improves the power generation characteristic of the fuel cell.

(5) According to one aspect of the invention, there is provided an electrode for fuel cell. This electrode for fuel cell comprises: carbon nanotubes; a catalyst for fuel cell supported on the carbon nanotubes; and an ionomer provided to coat the carbon nanotubes and the catalyst for fuel cell, wherein when a length of the carbon nanotubes is represented by La [μm] and a number density of the carbon nanotubes is represented by Nd [/m$^3$], the length La and the number density of the carbon nanotubes Nd satisfy two expressions given below: $30 \leq La \leq 240$; and $1.7 \times 10^{13} \leq Nd \leq 1.7 \times 10^{18}/(0.351 \times La+75)^2$. Even when a fuel cell including this electrode for fuel cell is compressed by application of a load, the electrode for fuel cell of this aspect makes pores between the carbon nanotubes less likely to be blocked and suppresses deterioration of gas diffusivity or drainage of water produced, thus improving the power generation characteristic.

(6) The electrode for fuel cell according to the aspects before, wherein the electrode for fuel cell comprising the nanotubes may be joined with the electrolyte membrane by thermal pressure and be subsequently compressed to a thickness of no less than 5 [μm] and no more than 20 [μm] to be used as a catalyst for a fuel cell. The electrode for fuel cell of this aspect provides both the good gas diffusivity and the good proton conductivity and thus improves the power generation characteristic of the fuel cell.

(7) The electrode for fuel cell according to the aspects before, wherein the electrode for fuel cell comprising the nanotubes may be joined with the electrolyte membrane by thermal pressure and be subsequently compressed to a thickness of no less than 7.5 [μm] and no more than 17.5 [μm] to be used as a catalyst for a fuel cell. The electrode for fuel cell of this aspect provides both the good gas diffusivity and the good proton conductivity and thus further improves the power generation characteristic of the fuel cell.

(8) The electrode for fuel cell according to the aspects before, wherein the ionomer may coat the carbon nanotubes in a thickness of no less than 2.5 [nm] and no more than 15 [nm]. The electrode for fuel cell of this aspect does not interfere with transport of oxygen through the ionomer to the surface of the catalyst for fuel cell and keeps the high concentration of oxygen in the vicinity of the catalyst, while keeping the good proton conductivity, thus improving the power generation characteristic of the fuel cell.

(9) The electrode for fuel cell according to the aspects before, wherein the ionomer may coat the carbon nanotubes in a thickness of no less than 5 [nm] and no more than 12.5 [nm]. The electrode for fuel cell of this aspect further improves the power generation characteristic of the fuel cell.

(10) The electrode for fuel cell according to the aspects before, wherein [mass of ionomer]/[mass of carbon nanotubes] which is a ratio of mass of the ionomer to mass of the carbon nanotubes may be no less than 0.5 and no more than 3.0. The electrode for fuel cell of this aspect improves the power generation characteristic of the fuel cell.

(11) The electrode for fuel cell according to the aspects before, wherein the [mass of ionomer]/[mass of carbon nanotubes] may be no less than 1.0 and no more than 2.5. The electrode for fuel cell of this aspect further improves the power generation characteristic of the fuel cell.

(12) The electrode for fuel cell according to the aspects before, wherein the ionomer may have solubility of oxygen that is higher than 10.9 mol/dm$^3$. The electrode for fuel cell of this aspect has the short distance between the surface of the ionomer and the catalyst furl fuel cell. Accordingly, increasing the solubility of oxygen in the ionomer increases supply of oxygen to the catalyst for fuel cell and improves the power generation characteristic of the fuel cell.

(13) The electrode for fuel cell according to the aspects before, wherein the ionomer may have solubility of oxygen that is equal to or higher than 20 mol/dm$^3$. The electrode for fuel cell of this aspect further improves the power generation characteristic of the fuel cell.

(14) According to one aspect of the invention, there is provided a production method of an electrode for fuel cell. The production method of an electrode for fuel cell comprises: making carbon nanotubes to grow on a substrate such that when a length of the carbon nanotubes is represented by La [μm] and an inter-core pitch of the carbon nanotubes is represented by Pa [nm], the length La and the inter-core pitch Pa satisfy two expressions given below: $30 \leq La \leq 240$ and $0.351 \times La+75 \leq Pa \leq 250$; making a catalyst for fuel cell supported on the carbon nanotubes; coating the carbon nanotubes with an ionomer; and joining the carbon nanotubes with the electrolyte membrane by application of thermal pressure to form a first catalyst layer. In a fuel cell including the electrode for fuel cell produced by the production method of the electrode for fuel cell of this aspect, the carbon nanotubes have a uniform thin coat of the ionomer. Even when the fuel cell is compressed by application of a load, this configuration makes pores between the carbon nanotubes in the first catalyst layer less likely to be blocked and suppresses deterioration of gas diffusivity or drainage of water produced, thus improving the power generation characteristic.

(15) According to one aspect of the invention, there is provided a production method of an electrode for fuel cell. The production method of an electrode for fuel cell comprises: making carbon nanotubes to grow on a substrate such that when a length of the carbon nanotubes is represented by La [μm] and a number density of the carbon nanotubes is represented by Nd [/m$^3$], the length La and the number density of the carbon nanotubes Nd satisfy two expressions given below: $30 \leq La \leq 240$ and $1.7 \times 10^{13} \leq Nd \leq 1.7 \times 10^{18}/(0.351 \times La+75)^2$; making a catalyst for fuel cell supported on the carbon nanotubes; coating the carbon nanotubes with an ionomer; and joining the carbon nanotubes with the electrolyte membrane by application of thermal pressure to form a first catalyst layer. In a fuel cell including the electrode for fuel cell produced by the production method of the electrode for fuel cell of this aspect, the carbon nanotubes have a uniform thin coat of the ionomer. Even when the fuel cell is compressed by application of a load, this configuration makes pores between the carbon nanotubes in the first catalyst layer less likely to be blocked and suppresses deterioration of gas diffusivity or drainage of water produced, thus improving the power generation characteristic.

(16) According to one aspect of the invention, there is provided a production method of a membrane electrode assembly. The production method of a membrane electrode assembly comprises: producing an electrode for fuel cell by the production method according to the aspects before; and applying and drying a catalyst ink on an opposite surface of the electrolyte membrane which is on an opposite side to a surface of the electrolyte membrane joined with the carbon nanotubes to form a second catalyst layer. In a fuel cell including the electrode for fuel cell produced by the manufacturing method of the membrane electrode assembly of this aspect, even when the fuel cell is compressed by application of a load, this configuration makes pores between the carbon nanotubes in the first catalyst layer less likely to be blocked and suppresses deterioration of gas diffusivity or drainage of water produced, thus improving the power generation characteristic.

According to one aspect of the invention, there is provided a production method of a fuel cell. The production method of a fuel cell comprises: forming a membrane electrode assembly by the manufacturing method according to the aspect before; forming a frame on an outer periphery of the membrane electrode assembly; placing gas diffusion layers on an inner side of the frame on both surfaces of the membrane electrode assembly; placing separator plates on outer surfaces of the gas diffusion layers to produce a unit cell; and stacking the unit cells and applying a load to the stacked unit cells such that the first catalyst layer is compressed to a thickness of no less than 5 [μm] and no more than 20 [μm]. The manufacturing method of the fuel cell of this aspect shortens the distance between the electrolyte membrane and the catalyst for fuel cell where power generation occurs. This keeps the good proton conductivity from the electrolyte membrane through the ionomer to the catalyst for fuel cell and thereby improves the power generation characteristic of the fuel cell. Additionally, in the case of stacking fuel cells, this configuration makes pores between the carbon nanotubes in the first catalyst layer less likely to be blocked and suppresses deterioration of gas diffusivity or drainage of water produced, thus manufacturing an electrode for fuel cell to improving the power generation characteristic.

The invention may be implemented by various aspects. The invention may be implemented by any of various aspects other than the electrode for fuel cell, for example, a membrane electrode assembly, a fuel cell, a production method of an electrode for fuel cell, a manufacturing method of a membrane electrode assembly and a production method of a fuel cell.

DESCRIPTION OF EMBODIMENT

Figure 1:
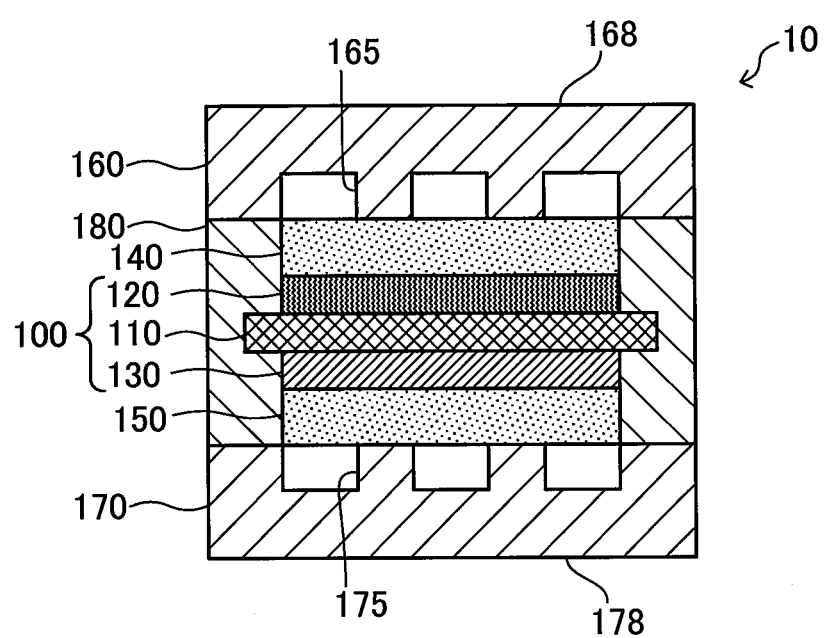
FIG. 1 is a diagram illustrating the general configuration of a fuel cell according to one embodiment of the invention.

Some embodiments of the invention are described below in the following sequence
A. Structure of Fuel Cell:
B. Formation of Catalyst Electrodes:
C. Evaluation:
A. Structure of Fuel Cell:

FIG. 1 is a diagram illustrating the general configuration of a fuel cell according to one embodiment of the invention. FIG. 1 schematically illustrates the cross sectional structure of a fuel cell 10. The fuel cell 10 includes a membrane electrode assembly 100, gas diffusion layers 140 and 150, a cathode separator plate 160, an anode separator plate 170 and a frame 180. The membrane electrode assembly 100 includes an electrolyte membrane 110, a cathode catalyst layer 120 and an anode catalyst layer 130.

The electrolyte membrane 110 may be a proton-conductive ion exchange membrane made of, for example, a fluororesin such as perfluorocarbon sulfonic acid polymer or hydrocarbon resin. In this embodiment, Nafion (registered trademark) manufactured by duPont is used for the electrolyte membrane 110.

According to this embodiment, a layer including platinum-supported carbon nanotubes (CNT) and an ionomer is used as the cathode catalyst layer 120. A layer including platinum-supported carbon particles and an ionomer is used, on the other hand, as the anode catalyst layer 130. The anode catalyst layer 130 does not include carbon nanotubes. In the description of this embodiment, an electrode comprised of a catalyst layer including platinum-supported carbon nanotubes (CNT) and an ionomer is called "CNT electrode", and an electrode comprised of a catalyst layer including platinum-supported carbon particles and an ionomer is called "carbon particle electrode". The anode catalyst layer 130 is a carbon particle electrode in this embodiment but may alternatively be a CNT electrode. In this embodiment, platinum is supported on the carbon particles or the carbon nanotubes, but a platinum alloy such as platinum cobalt, platinum ruthenium, platinum iron, platinum nickel or platinum copper may be used instead of platinum.

The membrane electrode assembly 100 has the frame 180 on its outer periphery. The frame 180 is made of a resin and is formed to be integrated with the membrane electrode assembly 100 by injection molding of the resin. The frame 180 supports the membrane electrode assembly and also serves as a gasket to suppress leakage of fuel gas or oxidizing gas.

Carbon cloth of carbon non-woven fabric or carbon paper may be used for the gas diffusion layers 140 and 150. This embodiment uses carbon paper. Other than carbon cloth or carbon paper, a metal or resin porous body may also be used for the gas diffusion layers 140 and 150.

The cathode separator pate 160 and the anode separator plate 170 are arranged to place the membrane electrode assembly 100 therebetween. The cathode separator plate 160 has grooves 165 formed on the membrane electrode assembly 100-side. The grooves 165 are used for the flow of an oxidizing gas (air). Similarly the anode separator plate 170 has grooves 175 formed on the membrane electrode assembly 100-side. The grooves 175 are used for the flow of a fuel gas (hydrogen). A surface of the cathode separator plate 160 on the opposite side to the surface where the grooves 165 are formed is called "surface 168". A surface of the anode separator plate 170 on the opposite side to the surface where the grooves 175 are formed is called "surface 178". In stacking the fuel cells 10, the surface 168 and the surface 178 are arranged to face each other and come into contact with each other. In order to form a cooling medium flow path between the surface 168 and the surface 178, at least one of the surface 168 and the surface 178 may have grooves for forming the cooling medium flow path.

Figure 2:
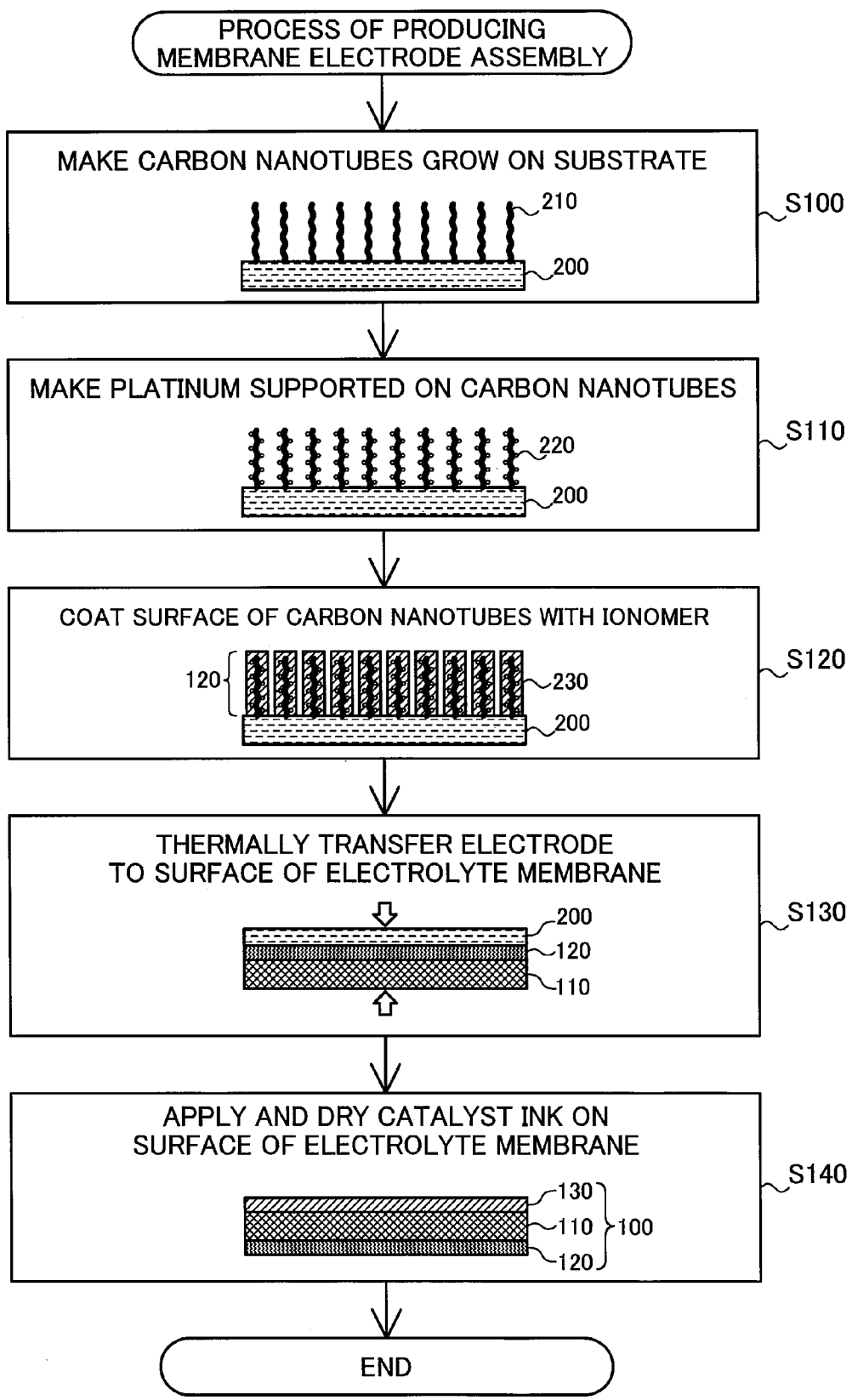
FIG. 2 is a diagram illustrating a process of producing a membrane electrode assembly.

B. Formation of Catalyst Electrodes:

FIG. 2 is a diagram illustrating a process of producing a membrane electrode assembly. The process makes carbon nanotubes 210 grow on a silicon substrate 200 at step S100. More specifically, the process first applies an iron catalyst as the growth core of carbon nanotubes 210 substantially uniformly on the silicon substrate 200 by, for example, sputtering. The thickness of the iron catalyst is preferably about 50 to 200 nm. The thickness of the iron catalyst affects the inter-core pitch of the carbon nanotubes 210 or the number density of the carbon nanotubes 210 (number of carbon nanotubes 210 per unit area). For example, an increase in thickness of the iron catalyst decreases the inter-core pitch of the carbon nanotubes 210 or increases the number density of the carbon nanotubes 210. It is preferable to experimentally determine the thickness of the iron catalyst according to the relation to a desired inter-core pitch or a desired number density of the carbon nanotubes 210. After sputtering the iron catalyst, the process heats the silicon substrate 200 to about 700° C. for annealing treatment. The annealing treatment changes the state of the iron catalyst on the silicon substrate 200 from the uniformly spread state to the dot-like growth core state.

The process subsequently makes the carbon nanotubes 210 grow on the silicon substrate 200 using the iron catalyst as the growth core. This embodiment employs CVD (chemical vapor deposition) method to make the carbon nanotubes 210 grow. The method first places the anneal-treated silicon substrate 200 in a quartz tube and increases the temperature in the quartz tube to about 700° C. with stream of helium gas under reduced pressure. The method subsequently substitutes part of the helium gas with acetylene gas and makes the flow of mixed gas of helium gas and acetylene gas to make the carbon nanotubes 210 grow. In general, the longer flow time of the mixed gas of helium gas and acetylene gas gives the longer carbon nanotubes 210. The shorter inter-core pitch (higher number density) gives the shorter carbon nanotubes 210 in the fixed flow time of the mixed gas of helium gas and acetylene gas. Accordingly, it is preferable to experimentally determine the flow time of the mixed gas of helium gas and acetylene gas by taking into account the length of the carbon nanotubes 210 and the inter-core pitch. The method subsequently changes the flow of mixed gas to the flow of only helium gas to stop the growth of carbon nanotubes and naturally cools down the grown nanotubes.

When the carbon nanotubes 210 are grown on the silicon substrate by the CVD method, the adjacent carbon nanotubes 210 limit the growth of the carbon nanotubes 210 in the direction along the surface of the silicon substrate 200. Accordingly the carbon nanotubes 210 are grown in the direction along the normal of the silicon substrate 200. In other words, the carbon nanotubes 210 are likely to be grown perpendicularly to the silicon substrate 200.

At step S110, the process makes platinum 220 supported on the carbon nanotubes 210. For example, the process dilutes a dinitrodiamine palatinate solution with ethanol and adds the diluted palatinate solution dropwise onto the carbon nanotubes 210. The process subsequently dries, fires and reduces the dropped palatinate solution to make the platinum 220 supported on the carbon nanotubes 210. It is preferable to adjust the platinum concentration of the palatinate solution and control the number of drops, such that the amount of the platinum 220 supported is 0.1 [mg] per square centimeters of the electrode.

At step S120, the process coats the surface of the carbon nanotubes 210 with an ionomer 230. More specifically, the process adds a dispersion of the ionomer 230 dropwise on the carbon nanotubes 210 and dries the dropped ionomer 230, so as to coat the surface of the carbon nanotubes 210 with the ionomer 230. The dispersion of the ionomer 230 is prepared such as to have the ratio of the mass (I) of the ionomer 230 included in the dispersion to the mass (C) of carbon of the carbon nanotubes 210 as the object to be coated, i.e., the ionomer/carbon mass ratio (I/C) equal to 1.5. An increase in value of I/C increases the thickness of the coat of the ionomer 230, while a decrease in value of I/C decreases the thickness of the coat of the ionomer 230.

At step S130, the process joins the carbon nanotubes 210 with the electrolyte membrane 110 to form the cathode catalyst layer 120. More specifically, the process places the electrolyte membrane 110 on the ends of the carbon nanotubes 210 and joins the carbon nanotubes 210 with the electrolyte membrane 110 (thermally transfers the carbon nanotubes 210 to the electrolyte membrane 110) under pressure of 5 [MPa] at temperature of 140[° C.]. This step forms the cathode catalyst layer 120.

At step S140, the process applies and dries a catalyst ink on the other surface of the electrolyte membrane 110 to form the anode catalyst layer 130. More specifically, the process first adds ethanol to carbon particles (for example, carbon black), further adds an aqueous chloroplatinic acid solution and stirs the mixture. The process subsequently filters the carbon particles-containing solution to make platinum supported on the carbon particles and obtains platinum-supported carbon particles. The process then adds ethanol, water and an ionomer to the platinum-supported carbon particles, stirs the mixture and performs ultrasonic dispersion to obtain a catalyst ink. The process subsequently applies and dries the catalyst ink on the other surface of the electrolyte membrane 110 to form the anode catalyst layer 130. In FIG. 2, the membrane electrode assembly 100 at step S140 is turned upside down from step S130. This series of steps produces the membrane electrode assembly 100.

C. Evaluation

Figure 3:
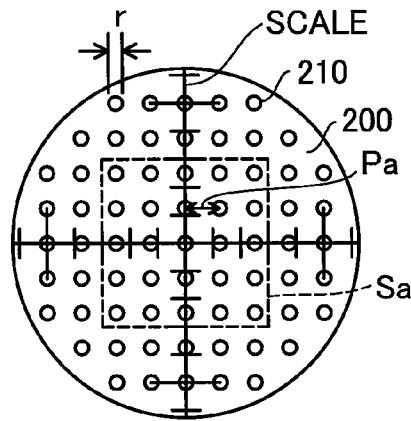
FIG. 3 is a diagram schematically illustrating the silicon substrate on which the carbon nanotubes are grown, viewed microscopically from the top.

C-1. Measurement of Inter-Core Pitch and Length of Carbon Nanotubes:

FIG. 3 is a diagram schematically illustrating the silicon substrate 200 on which the carbon nanotubes 210 are grown, viewed microscopically from the top. An inter-core pitch Pa of the carbon nanotubes 210 is measurable by using a microscope with a micrometer as shown in FIG. 3. For example, when the substrate with the carbon nanotubes 210 grown thereon is microscopically viewed from the top, the locations where the carbon nanotubes 210 are grown are expressed as dots as shown in FIG. 3. Accordingly, the inter-core pitch Pa of the carbon nanotubes 210 is determinable by measuring the interval between two adjacent carbon nanotubes 210 with the micrometer.

As a matter of convenience, the carbon nanotubes 210 are shown to be arranged at square lattices in FIG. 3. The carbon nanotubes 210 are, however, actually located at random on the silicon substrate 200. In such actual state, the inter-core pitch Pa of the carbon nanotubes 210 is varied depending on the selection of the carbon nanotubes 210 for measurement of the inter-core pitch Pa. In this case, the inter-core pitch Pa may be determined by counting the number of carbon nanotubes 210 in a fixed area Sa and thereby counting the number of carbon nanotubes 210 per unit area (number density).

When the inter-core pitch of the carbon nanotubes 210 is represented by Pa [m] and the number of carbon nanotubes per square meters (hereinafter also called "number density") is represented by Nd [/m²], the relationship of Equation (1) or Equation (2) given below is satisfied:

$$Nd = 1/(Pa)^2 \quad (1)$$

$$Pa = (1/\sqrt{Nd}) \quad (2)$$

Accordingly, this procedure counts the number of carbon nanotubes 210 in the area Sa to calculate the number density and subsequently determine the inter-core pitch Pa of the carbon nanotubes 210 according to Equation (2).

In FIG. 3, an outside diameter radius r of the carbon nanotubes 210 also is measurable. The outside diameter radius r of the carbon nanotubes 210 used in this embodiment is preferably 5 to 50 [nm]. When the outside diameter radius r of the carbon nanotubes 210 is less than 5 [nm], bundling or aggregation of the carbon nanotubes 210 is likely to occur in the course of adding the dinitrodiamine platinate solution dropwise or in the course of adding the ionomer dropwise. Inside of the bundle of the carbon nanotubes 210, pores for diffusing the gas are blocked. Suppression of bundling is thus desirable. When the outside diameter radius r of the carbon nanotubes 210 is greater than 50 [nm], on the other hand, the carbon nanotubes 210 have increased rigidity. This may result in a problem that the carbon nanotubes 210 are not compressed but are stuck through the electrolyte membrane 110 under application of a clamping load in the course of stacking the fuel cells 10, so as to make a short circuit. In terms of the above discussion, the more preferable outside diameter radius r of the carbon nanotubes 210 is 10 to 30 [nm].

Figure 4:
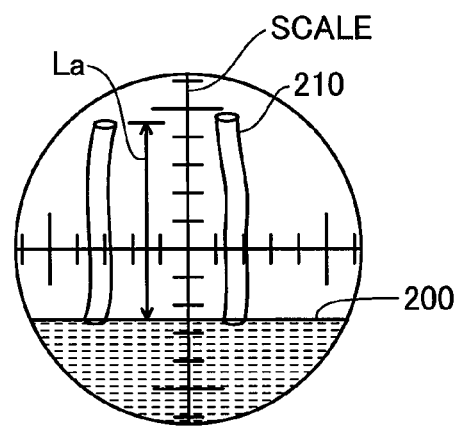
FIG. 4 is a diagram schematically illustrating the silicon substrate on which the carbon nanotubes grown, laterally viewed microscopically.

FIG. 4 is a diagram schematically illustrating the silicon substrate 200 on which the carbon nanotubes 210 grown, laterally viewed microscopically. A length La of the carbon nanotubes 210 is measurable using a microscope with a micrometer as shown in FIG. 4.

The number density Nd and the inter-core pitch Pa of the carbon nanotubes 210 may also be calculated by the following procedure. When the outside diameter radius of the carbon nanotubes 210 is represented by r [m], the mass of the carbon nanotubes 210 is represented by W [kg], the degree of curvature of the carbon nanotubes 210 is represented by τ, the thickness of the carbon nanotube layer is represented by H [m] and the density of the carbon nanotubes 210 is represented by d [g/m3], the number of carbon nanotubes 210 on the silicon substrate 200 is expressed as Equation (3) given below:

$$\text{The number } [-] = (W/d)/(\pi r^2 \times H \times \tau) \quad (3)$$

The thickness H [m] of the carbon nanotube layer is equal to the length La of the carbon nanotubes 210.

In Equation (3), (W/d) of the numerator on the right side is given by dividing the mass of the carbon nanotubes 210 by the density of the carbon nanotubes and shows the volume occupied by the carbon nanotubes 210 on the silicon substrate 200, and $\pi r^2$ of the denominator shows the cross sectional area of one carbon nanotube 210. Accordingly $\pi r^2 \times H$ shows the volume of one carbon nanotube 210 on the assumption that the carbon nanotube is a straight cylinder. The carbon nanotubes 210 are, however, not necessarily straight but may be bent or curved, for example, in a wave shape. The degree of bending is shown by the degree of curvature τ. The degree of curvature τ may be used as a conversion factor for converting the volume of one curved carbon nanotube 210 from the volume of the cylinder. Equation (3) accordingly divides the total volume of the carbon nanotubes 210 by the volume of one carbon nanotube 210 to calculate the number of carbon nanotubes 210. Equation (3) determines the number density of the carbon nanotubes 210 by substituting the mass W [kg] of the carbon nanotubes 210 in Equation (3) with a mass w per square meters [kg/m²]. The outside diameter radius r of the carbon nanotubes 210 and the length of the carbon nanotubes 210 are measurable by using a microscope with a micrometer by the methods shown in FIGS. 3 and 4. The density of the carbon nanotubes is 1.33 to 1.40 [g/cm³] (1.33×10³ to 1.40×10³ [kg/m³]).

Figure 5:
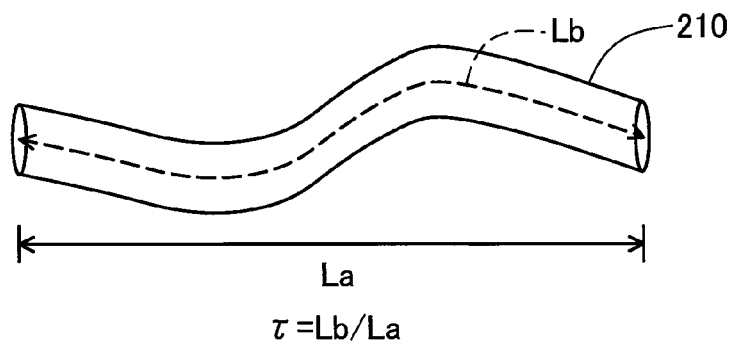
FIG. 5 is a diagram schematically illustrating the procedure of determining the degree of curvature τ of the carbon nanotubes.

FIG. 5 is a diagram schematically illustrating the procedure of determining the degree of curvature τ of the carbon nanotubes 210. The distance between the respective ends of the carbon nanotube 210 is represented by La [m]. This distance La is determinable by the method shown in FIG. 4. The length of the carbon nanotube 210 along its center axis is represented by Lb [m]. The length Lb may be determined, for example, using a micrograph of the carbon nanotubes 210. The carbon nanotubes 210 are bent and curved three-dimensionally, so that it is preferable to determine the length Lb using two micrographs, for example, in two different directions orthogonal to each other. The degree of curvature τ is calculated by Equation (4) given below. The degree of curvature τ is a dimensionless number and is a value of no less than 1:

$$\tau = Lb/La \quad (4)$$

Figure 6:
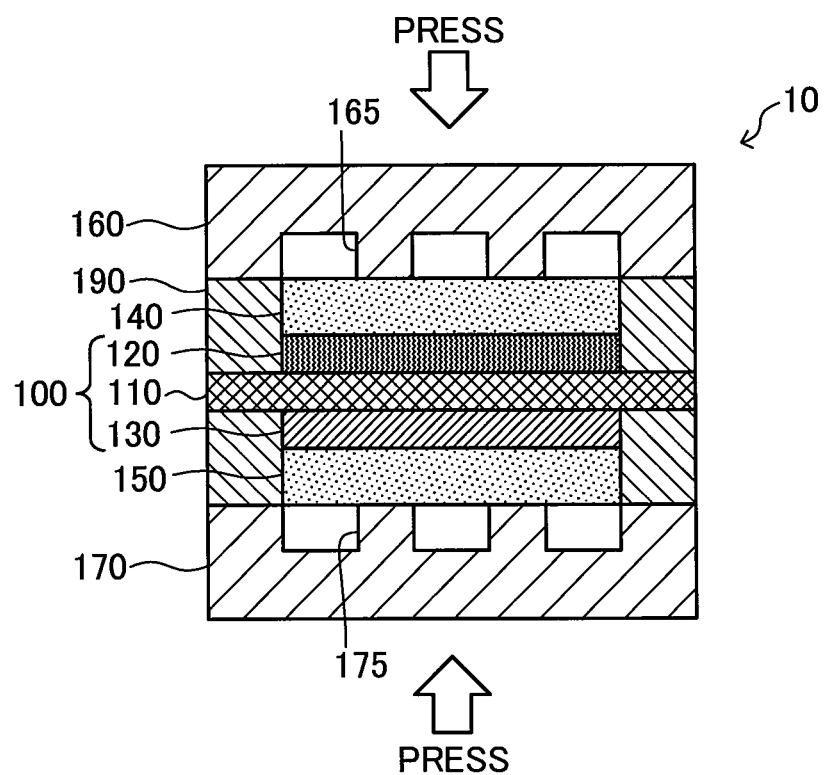
FIG. 6 is a diagram schematically illustrating a fuel cell for measurement of power generation characteristic.

C-2. Measurement Method of Power Generation Characteristic:

FIG. 6 is a diagram schematically illustrating a fuel cell for measurement of power generation characteristic. The fuel cell shown in FIG. 6 differs from the fuel cell shown in FIG. 1 as follows. In the fuel cell shown in FIG. 1, the outer periphery of the electrolyte membrane 110 is supported by the frame 180. In the fuel cell shown in FIG. 6, on the other hand, spacers 190 are provided between the cathode separator plate 160 and the electrolyte membrane 110 and between the anode separator plate 170 and the electrolyte membrane 110. The spacers 190 are members used to determine the thicknesses of the cathode catalyst layer 120 and the anode catalyst layer 130 in the case of pressing and compressing between the cathode separator plate 160 and the anode separator plate 170. The thicknesses of the cathode catalyst layer 120 and the anode catalyst layer 130 after compression are changed by changing the thickness of the spacer 190.

Figure 7:
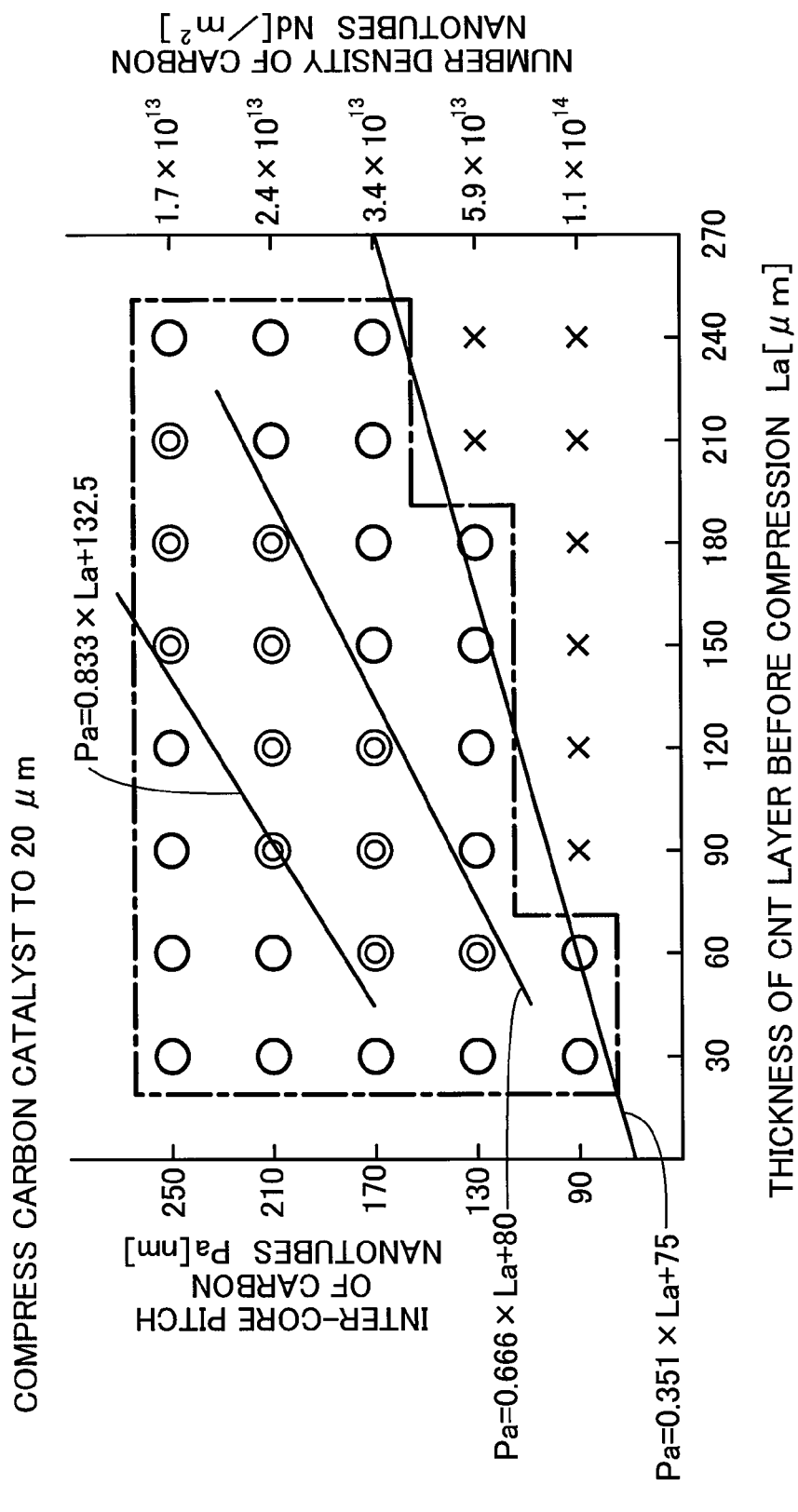
FIG. 7 is a diagram showing results of evaluation of power generation characteristic when the thickness of the carbon catalyst layer is compressed to 20 [μm].

C-3. Various Parameters of Carbon Nanotubes and Power Generation Characteristic:

FIG. 7 is a diagram showing results of evaluation of power generation characteristic when the thickness of the carbon catalyst layer is compressed to 20 [μm]. In FIG. 7, the abscissa shows the thickness La of the carbon nanotube layer before compression; the left ordinate shows the inter-core pitch of the carbon nanotubes; and the right ordinate shows the number density of carbon nanotubes. The thickness La of the carbon nanotube layer before compression corresponds to the length La of the carbon nanotubes 210 measured in FIG. 4 as described above. The following shows electrode conditions, measurement conditions and judgment criteria used for evaluation of the power generation characteristic:

(1) Electrode Conditions:
amount of platinum supported: 0.1 [mg/cm$^2$]
ionomer: DE2020CS manufactured by duPont
I/C mass ratio=1.5
(2) Measurement Conditions:
cell temperature: 70° C.
anode gas: stoichiometric ratio of 1.2, pressure of 140 [kPa], without humidification
cathode gas: stoichiometric ratio of 1.5, pressure of 140 [kPa], without humidification
(3) Judgment Criteria:
The voltage for extracting electric current of 2.0 [A/cm$^2$] from the fuel cell has been measured. The voltage of not lower than 0.6 [V] is judged as excellent and is shown by double circle in FIG. 7. The voltage of higher than 0 [V] but lower than 0.6 [V] is judged as good and is shown by circle in FIG. 7. Failure of power generation is judged as power generation failed and is shown by cross mark in FIG. 7.

As shown in FIG. 7, the following ranges are the ranges having the power generation characteristic of good or excellent.

TABLE 1

| Inter-core pitch Pa [nm] | Length of the CNT before compression La [μm] | Number density Nd [/m$^2$] |
|---|---|---|
| 30 ≤ Pa ≤ 60 | 90 ≤ La ≤ 250 | 1.7 × 10$^{13}$ ≤ Nd ≤ 11 × 10$^{13}$ |
| 60 < Pa ≤ 180 | 130 ≤ La ≤ 250 | 1.7 × 10$^{13}$ ≤ Nd ≤ 5.9 × 10$^{13}$ |
| 180 < Pa ≤ 240 | 170 ≤ La ≤ 250 | 1.7 × 10$^{13}$ ≤ Nd ≤ 3.4 × 10$^{13}$ |

The ranges having the power generation characteristic of good or excellent in FIG. 7 may be expressed as ranges satisfying both Expressions (5) and (6) given below:

$$30 \leq La \leq 240 \tag{5}$$

$$0.351 \times La + 75 \leq Pa \leq 250 \tag{6}$$

For example, when the length La of the carbon nanotubes 210 before compression is La=30 [μm], according to Expression (6), the range of the inter-core pitch Pa [nm] is expressed by Expression (7) given below:

$$0.351 \times 30 + 75 = 85.53 \text{ [nm]} \leq Pa \leq 250 \text{ [nm]} \tag{7}$$

The maximum value of the length La (240 [μm]) and the maximum value of the inter-core pitch Pa (250 [nm]) are the maximum values of these parameters used for evaluation, and the ranges of no more than these maximum values are sufficient in practical use.

The ranges having the power generation characteristic of good or excellent in FIG. 7 may also be expressed by Expressions (8) and (9) given below, instead of above Expressions (5) and (6), using the length La [μm] and the number density Nd [/m$^2$] of the carbon nanotubes 210 before compression:

$$30 \leq La \leq 240 \tag{8}$$

$$1.7 \times 10^{13} \leq Nd \leq 1.7 \times 10^{18}/(0.351 \times La + 75)^2 \tag{9}$$

In Expression (9), (0.351×La+75) of the denominator is in the unit of nanometer (nm) as shown by Expression (7). Accordingly, Expression (9) multiplies the numerator on the right side by (1×10$^{18}$) for conversion to "per square meters".

The ranges having the power generation characteristic of excellent in FIG. 7 may be expressed as ranges satisfying both Expressions (10) and (11) given below:

$$60 \leq La \leq 210 \tag{10}$$

$$0.666 \times La + 80 \leq Pa \leq 0.833 \times La + 132.5 \tag{11}$$

Figure 8:
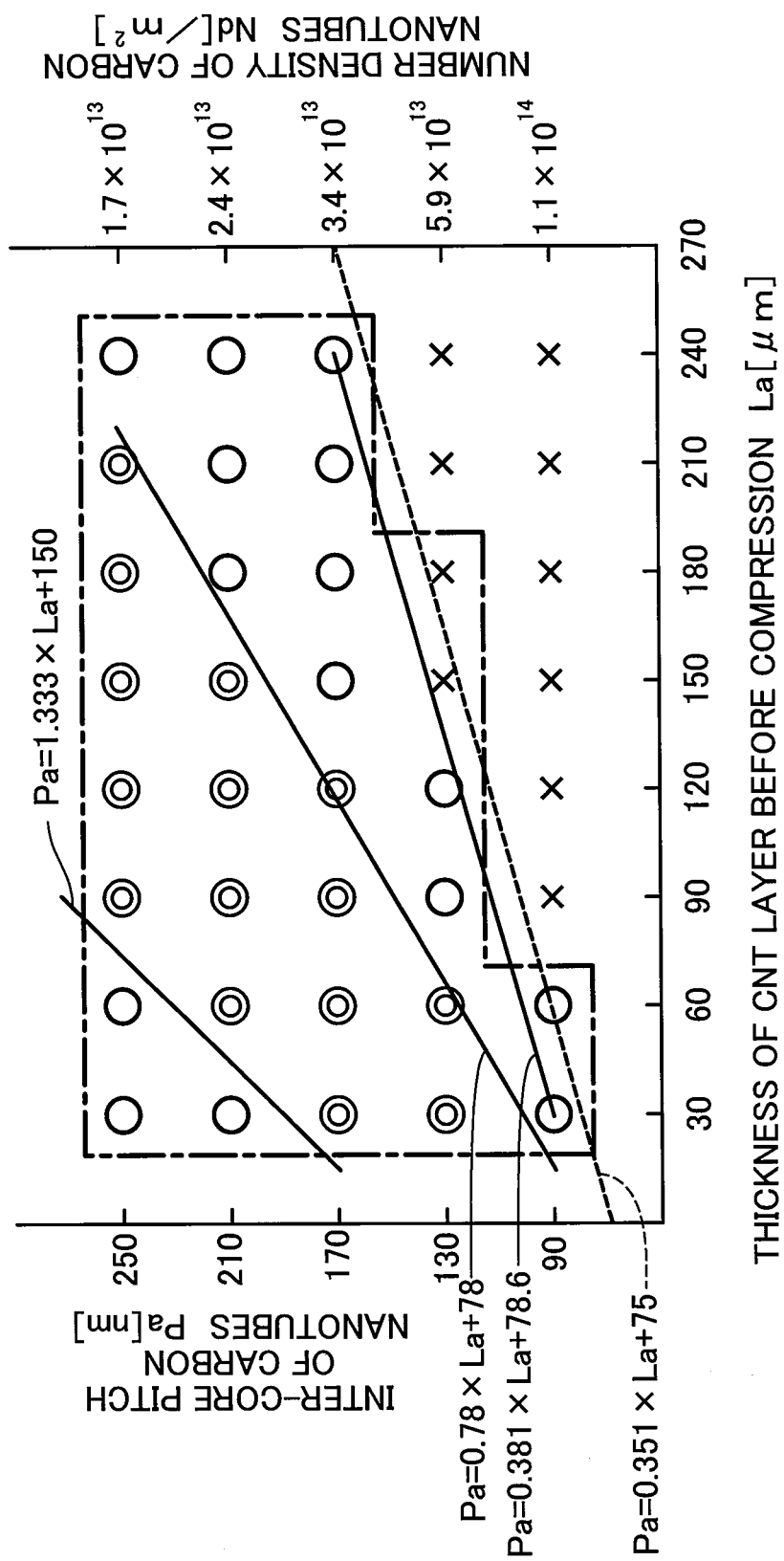
FIG. 8 is a diagram showing results of evaluation of power generation characteristic when the thickness of the carbon catalyst layer is compressed to 15 [μm].
Figure 9:
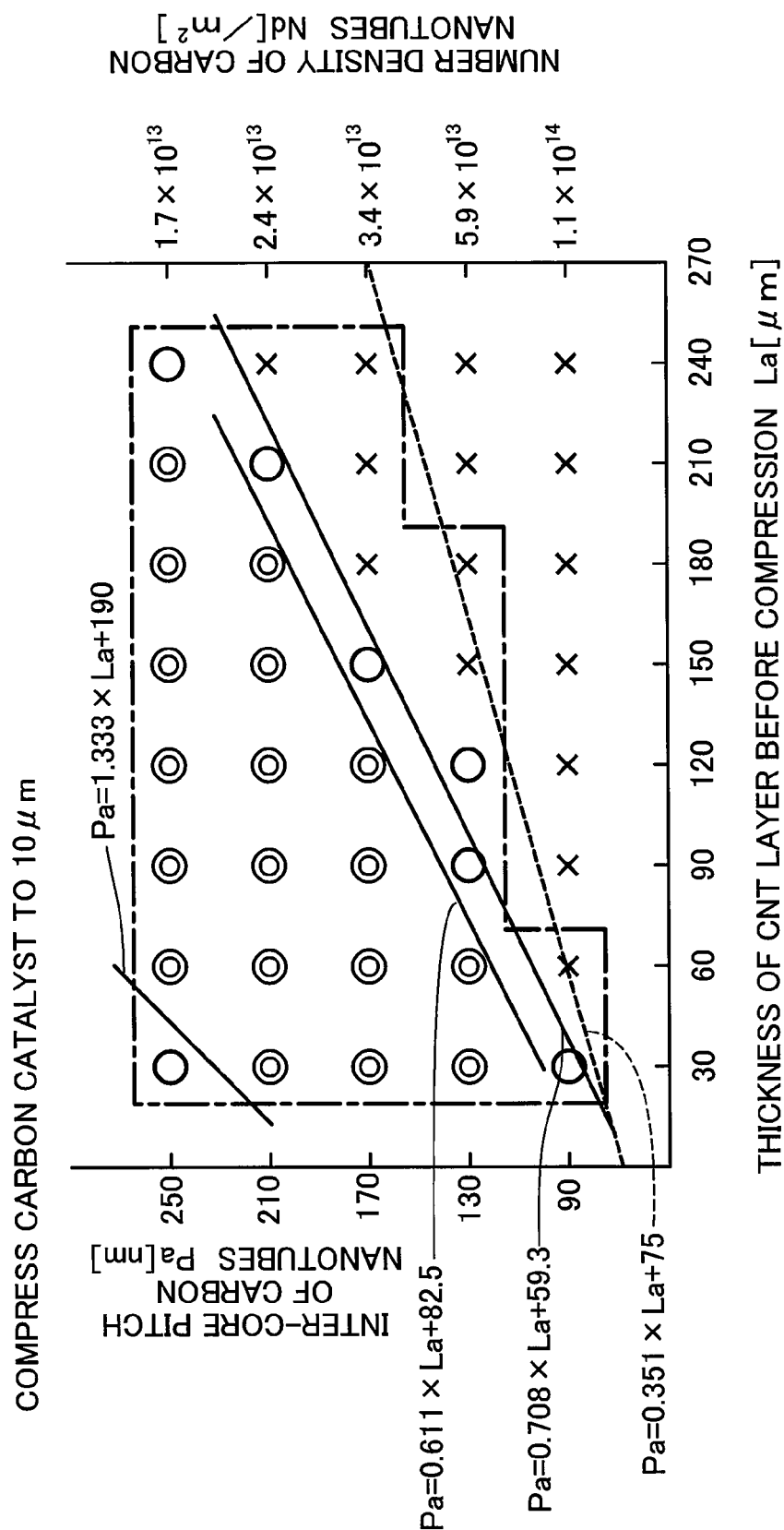
FIG. 9 is a diagram showing results of evaluation of power generation characteristic when the thickness of the carbon catalyst layer is compressed to 10 [μm].
Figure 10:
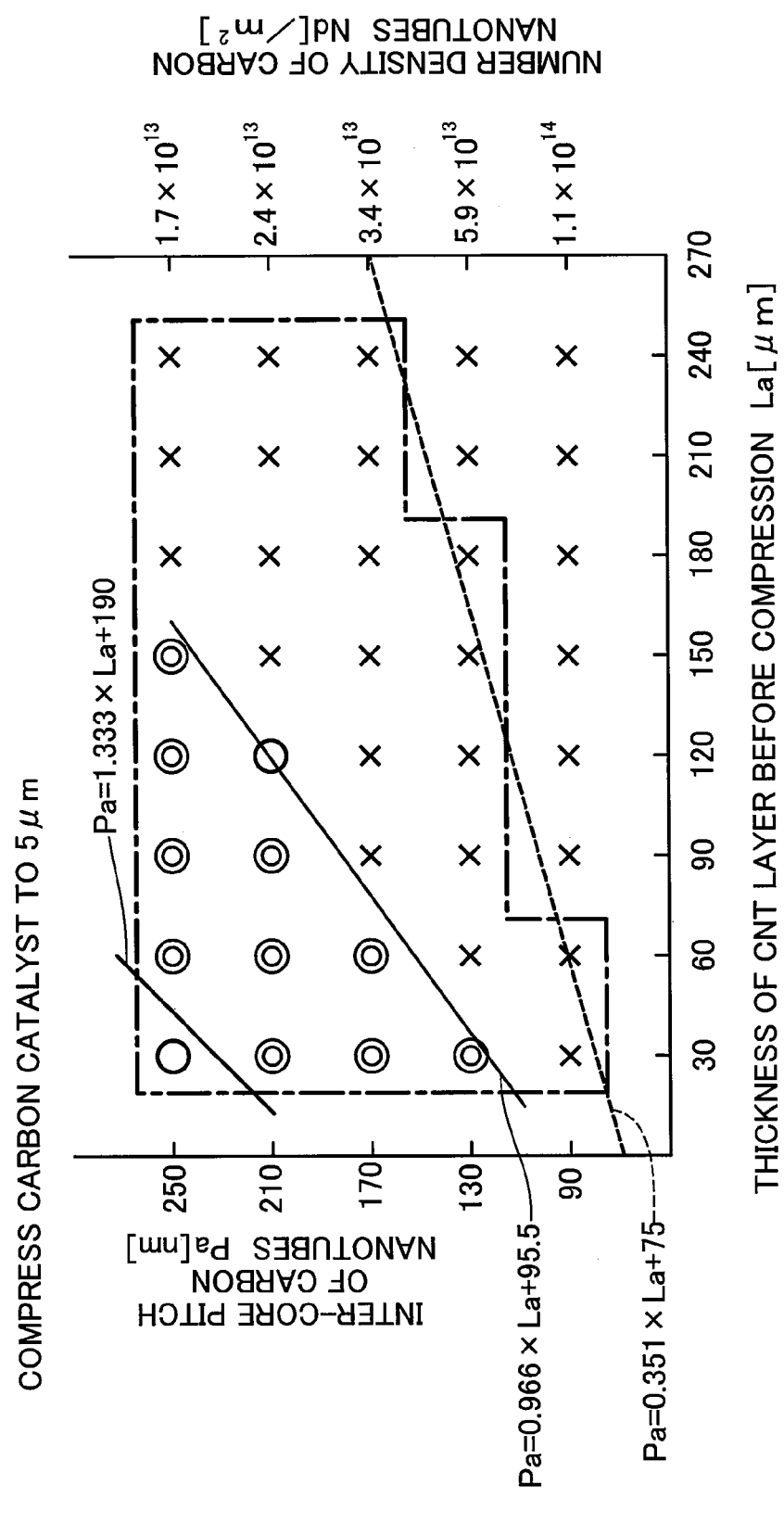
FIG. 10 is a diagram showing results of evaluation of power generation characteristic when the thickness of the carbon catalyst layer is compressed to 5 [μm].

FIGS. 8 to 10 are diagram showing results of evaluation of power generation characteristic when the thickness of the carbon catalyst layer 120 is compressed to 15 [μm], 10 [μm] and 5 [μm], respectively. FIGS. 8 to 10 have different thicknesses of the cathode catalyst layer 120 after compression from that of FIG. 7 but otherwise employ the same conditions. The following describes the ranges of good or excellent and the ranges of excellent with regard to the respective graphs.

The ranges having the power generation characteristic of good or excellent in FIG. 8 may be expressed as ranges satisfying both Expressions (12) and (13) given below:

$$30 \leq La \leq 240 \tag{12}$$

$$0.381 \times La + 78.6 \leq Pa \leq 250 \tag{13}$$

The ranges having the power generation characteristic of excellent in FIG. 8 may be expressed as ranges satisfying both Expressions (14) and (15) given below:

$$30 \leq La \leq 210 \tag{14}$$

$$0.78 \times La + 78 \leq Pa \leq 1.333 \times La + 150 \tag{15}$$

The ranges having the power generation characteristic of good or excellent in FIG. 9 may also be expressed by Expressions (16) and (17) given below:

$$30 \leq La \leq 240 \tag{16}$$

$$0.705 \times La + 59.3 \leq Pa \leq 250 \tag{17}$$

The ranges having the power generation characteristic of excellent in FIG. 9 may be expressed as ranges satisfying both Expressions (18) and (19) given below:

$$30 \leq La \leq 240 \tag{18}$$

$$0.611 \times La + 82.5 \leq Pa \leq 1.333 \times La + 190 \tag{19}$$

Defining Expression (19) by the number density Nd gives Expression (20) below.

$$1 \times 10^{18}/(1.333 \times La + 190)^2 \leq Nd \leq 1 \times 10^{18}/(0.611 \times La + 82.5)^2 \tag{20}$$

The ranges having the power generation characteristic of good or excellent in FIG. 10 may also be expressed by Expressions (21) and (22) given below:

$$30 \leq La \leq 150 \tag{21}$$

$$0.966 \times La + 95.5 \leq Pa \leq 250 \tag{22}$$

The ranges having the power generation characteristic of excellent in FIG. 10 may be expressed as ranges satisfying both Expressions (23) and (24) given below:

$$30 \leq La \leq 1500 \tag{23}$$

$$0.966 \times La + 95.5 \leq Pa \leq 1.333 \times La + 190 \tag{24}$$

According to comparison among FIGS. 7 to 10, a decrease in thickness of the cathode catalyst layer 120 expands the range of power generation failed in the lower right of the graph. This range has the short inter-core pitch Pa (or the high number density Nd) of the carbon nanotubes 210 and the long length La of the carbon nanotubes 210 before compression. When the cathode catalyst layer 120 is compressed, in this range, compression is expected to block the pores between the carbon nanotubes 210 and deteriorate the gas diffusivity or the drainage of water produced. In other words, the more compression of the carbon nanotubes 210 is expected to give the larger range of power generation ailed in the lower right of the graph. The deterioration of gas diffusivity and drainage may increase the concentration overpotential and cause a voltage drop even in the case of power generation enabled.

When the cathode catalyst layer 120 is compressed to 5 [μm] or thinner, the high clamping load is applied in the course of stacking the fuel cells 10. In this case, due to the high clamping load, the carbon nanotubes 210 in the cathode catalyst layer 120 and the carbon fibers in the gas diffusion layer 140 are likely to be stuck through the electrolyte membrane 110 and cause cross leakage. It is accordingly preferable not to compress the cathode catalyst layer 120 to the thickness of 5 [μm] or thinner.

According to comparison of the ranges having the power generation characteristic of excellent, the area of this excellent range is maximized in the case of compressing the cathode catalyst layer to 10 to 15 [μm] (FIG. 8, FIG. 9) and is reduced both in the case of the less compression and in the case of the more compression. Compression shortens the distance between the electrolyte membrane 110 and the cathode catalyst layer 120 where power generation occurs. This keeps the proton conductivity from the electrolyte membrane 110 through the ionomer 230 to the catalyst for fuel cell (platinum 220) in the good condition and thereby improves the power generation characteristic. Excessive compression may, however, cause the greater number of pores between the carbon nanotubes 210 to be blocked and result in further deteriorating the gas diffusivity or the drainage of produced water as described above. By balancing these factors, the area of the range having the power generation characteristic of excellent is maximized when the cathode catalyst layer 120 is compressed to 10 to 15 [μm].

Figure 11:
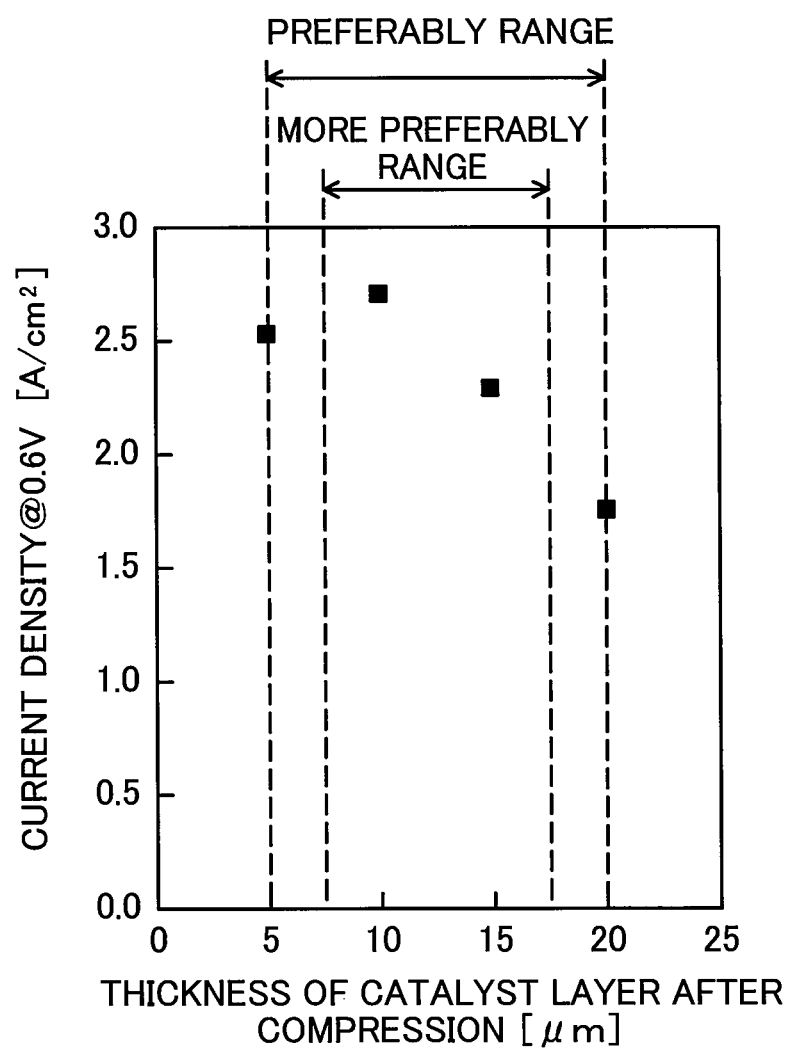
FIG. 11 is a diagram showing the relationship between the thickness of the catalyst and the current density after compression of the cathode catalyst layer.

FIG. 11 is a diagram showing the relationship between the thickness of the catalyst and the current density after compression of the cathode catalyst layer. In FIG. 11, the current density at the voltage of 0.6 V is plotted against the thickness of the cathode catalyst layer 120 under the conditions that the length La of the carbon nanotubes 210 before compression is 40 [μm] and the inter-core pitch Pa of the carbon nanotubes 210 is 170 [nm]. According to FIG. 11, the range of the thickness of the cathode catalyst layer 120 after compression is preferably the range of 5 [μm] to 20 [μm] and is more preferably the range of 7.5 [μm] to 17.5 [μm]. The lower limit of the more preferable range is set not to 5 [μm] but to 7.5 [μm] with referring to the results of FIGS. 7 to 10.

Figure 12:
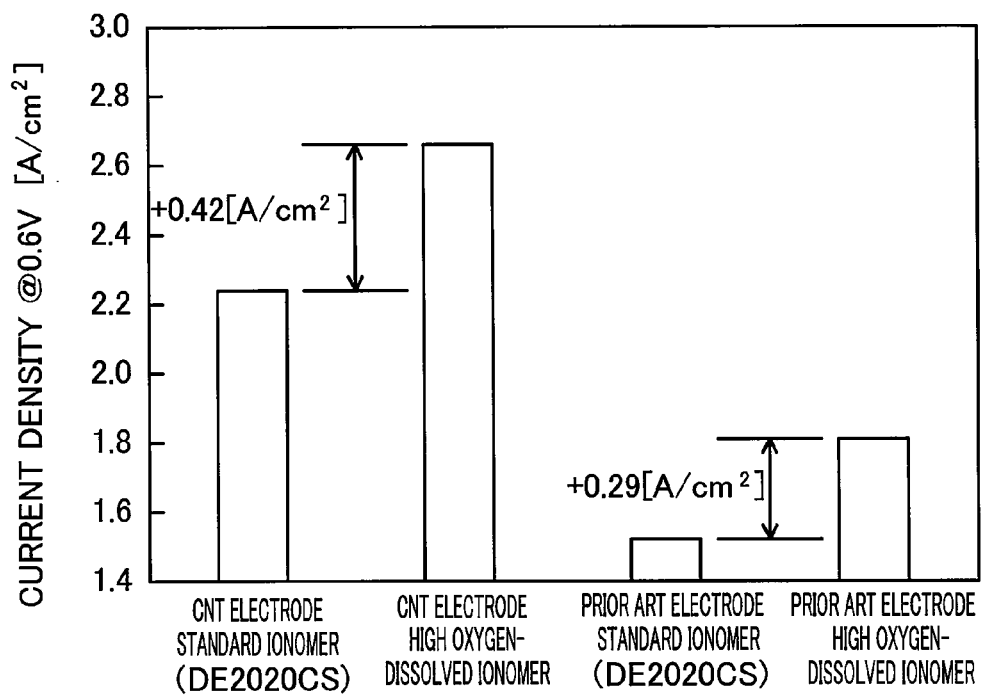
FIG. 12 is a diagram showing comparison between current densities using a standard ionomer and a high oxygen-dissolved ionomer.

C-4. Power Generation Characteristic with Respect to Ionomer:

FIG. 12 is a diagram showing comparison between current densities using a standard ionomer and a high oxygen-dissolved ionomer. In this comparison, DE2020CS manufactured by duPont has been used as the standard ionomer, and an ionomer shown by the following chemical formula (Chem. 1) disclosed in commonly assigned Japanese Patent Application 2010-229903 (JP 2012-84398 A) has been used as the high oxygen-dissolved ionomer.

[Chem. 1]

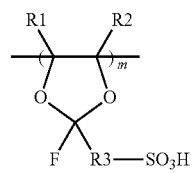

(Chem1)

In the above chemical formula (Chem. 1), R1 and R2 respectively represent fluorine atom or a perfluoroalkyl group containing 1 to 10 carbon atoms. The perfluoroalkyl group of R1 or R2 may contain oxygen atom in the molecular chain. R3 represents a perfluoroalkylene group containing 1 to 10 carbon atoms. The perfluoroalkylene group of R3 may contain oxygen atom in the molecular chain. The sulfo group ($-SO_3H$) may be replaced by trifluoromethyl group ($-CF_3$). In the formula, m is an integral number of no less than 1.

The high oxygen-dissolved ionomer may be obtained by polymerization of a monomer expressed by the following chemical formula (Chem. 2):

[Chem. 2]

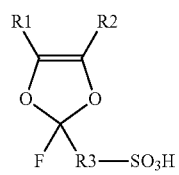

(Chem2)

According to the comparison between the carbon particle electrode and the CNT electrode in FIG. 12, the CNT electrode has the higher current density. Additionally, with respect to both the carbon particle electrode and the CNT electrode, using the high oxygen-dissolved ionomer gives the higher current density than using the standard ionomer. Especially when the ionomer is changed from the standard ionomer to the high oxygen-dissolved ionomer, using the CNT electrode has a greater amount of increase in current density than using the carbon particle electrode.

Figure 13:
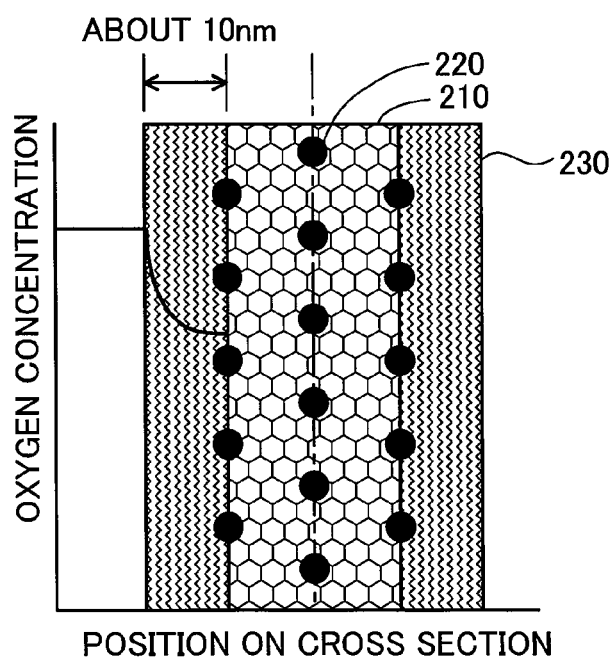
FIG. 13 is a diagram showing the relationship of the electrode structure to the oxygen concentration in the ionomer when carbon nanotubes are used for the electrode material.

FIG. 13 is a diagram showing the relationship of the electrode structure to the oxygen concentration in the ionomer when carbon nanotubes are used for the electrode material. When the carbon nanotube 210 is used for the electrode material, the carbon nanotube 210 has a large number of π electrons, so that electrons readily move on the carbon nanotube 210. The entire surface of the carbon nanotube 210 in the approximately cylindrical shape has a thin coat of the ionomer 230. The distance from the surface of the ionomer 230 to the platinum 220 is accordingly short as about 10 nm. Because of the short distance from the surface of the ionomer 230 to the platinum 220, the diffusivity of oxygen in the ionomer 230 does not significantly affect the power generation characteristic. In this case, increasing the solubility of oxygen in the ionomer 230 enables a high concentration of oxygen to be supplied to the platinum 220. Accordingly, using the high oxygen-dissolved ionomer increases the supply amount of oxygen to the platinum and thereby increases the current density.

Figure 14:
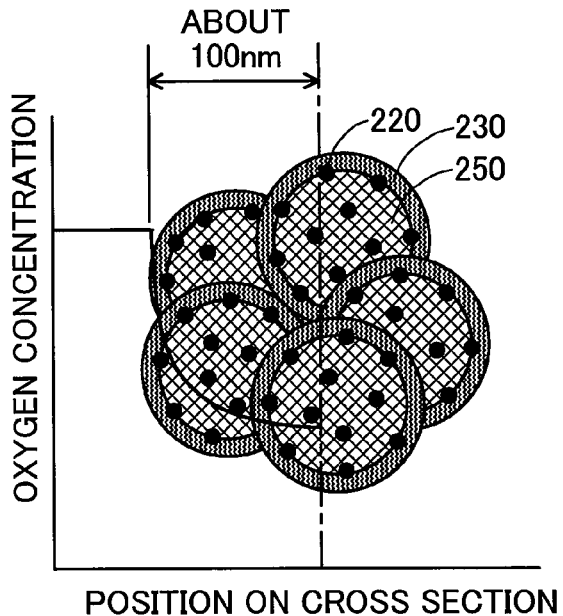
FIG. 14 is a diagram showing the relationship of the electrode structure to the oxygen concentration in the ionomer when carbon particles are used for the electrode material.

FIG. 14 is a diagram showing the relationship of the electrode structure to the oxygen concentration in the ionomer when carbon particles are used for the electrode material. When carbon particles 250 are used for the electrode material, the carbon particles 250 form an aggregate, which is coated with the ionomer 230. Even when the carbon particles 250 themselves have electrical conductivity, a large contact resistance between the carbon particles 250 forming the aggregate makes electric current less likely to flow. Additionally, the presence of part of the platinum 220 (catalyst) not coated with the ionomer prevents proton from being supplied to the overall platinum. Accordingly, the CNT electrode gives the higher current density than the carbon particle electrode. The carbon particles 250 of the carbon particle electrode form a large lump of aggregate. In this case, the average distance from the surface of the ionomer 230 to the platinum is relatively large as about 100 nm. Because of the large moving distance of oxygen in the ionomer 230, not only the solubility of oxygen in the ionomer 230 but the diffusivity of oxygen in the ionomer 230 affects the power generation characteristic. Using the high oxygen-dissolved ionomer as the ionomer 230 increases the current density but does not increase the current density so effectively as using the CNT electrode. The CNT electrode having the thinner coat of the ionomer 230 and the shorter distance from the surface of the ionomer 230 to the platinum has the less effect of the oxygen diffusivity in the ionomer 230 and is thus likely to improve the current density.

Figure 15:
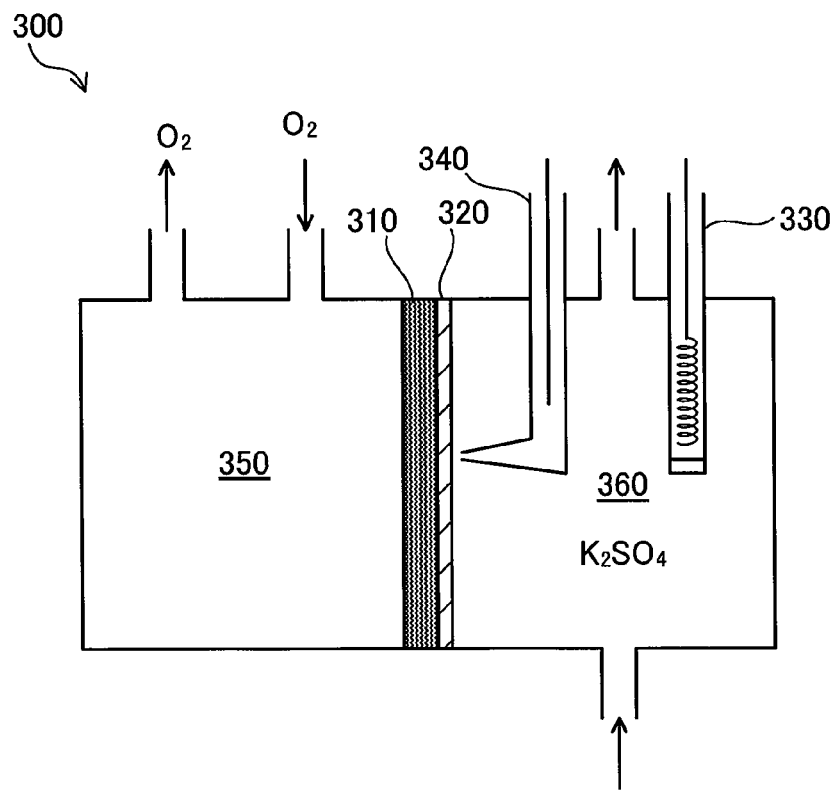
FIG. 15 is a diagram illustrating one example of an apparatus for measuring the solubility of oxygen in the ionomer.

FIG. 15 is a diagram illustrating one example of an apparatus for measuring the solubility of oxygen in the ionomer. The method described in cited document "Z. Ogumi, Z. Takehara and S. Yoshizawa, J. Electrochem. Soc., 131, 769 (1984)" has been employed for measurement of the solubility of oxygen in the ionomer. A measurement apparatus 300 for the solubility of oxygen in the ionomer includes a membrane 310 as an object to be measured, a working electrode 320, a counter electrode 330, a reference electrode 340, a gas chamber 350 and a solution chamber 360. The membrane 310 is placed to part the gas chamber 350 from the solution chamber 360. The solution chamber 360 is filled with, for example, a 0.5 M potassium sulfate solution. The working electrode 320 is located on the solution chamber 360-side surface of the membrane 310. The working electrode 320 is formed from an SPE composite electrode. The counter electrode 330 and the reference electrode 340 are placed in the solution chamber 360. A silver/silver chloride electrode is used for the reference electrode 340. A standard hydrogen electrode (SHE) or a saturated calomel electrode may be used instead of the silver/silver chloride electrode. The silver/silver chloride electrode is, however, commonly used since the standard hydrogen electrode has difficulty in adjustment of the hydrogen partial pressure and the saturated calomel electrode uses mercury.

The gas chamber 350 is filled in advance with nitrogen, and oxygen is subsequently introduced into the gas chamber. Oxygen is dissolved in the membrane 310 and moves toward the working electrode 320. The solubility of oxygen in the membrane 310 is calculated by measuring the potential using the working electrode 320. For example, the solubility of oxygen in the membrane 310 may be calculated by calculating the concentration of oxygen in the membrane 310 from the measured potential according to Nernst equation.

According to the description of Table III in "Zempachi Ogumi, Tohru Kuroe and Zen-ichiro Takehara, J. Electrochem. Soc.: ELECTROCHEMICAL SCIENCE AND TECHNOLOGY November 1985, Vol. 132, No. 11", the solubility of oxygen in Nafion is 10.7 to 10.9 [$mol/dm^3$]. It is accordingly preferable to use an ionomer having the solubility of oxygen greater than this value, for example, an ionomer having the solubility of oxygen of no less than 20 $mol/dm^3$, which is about twice the solubility of oxygen in Nafion.

Figure 16:
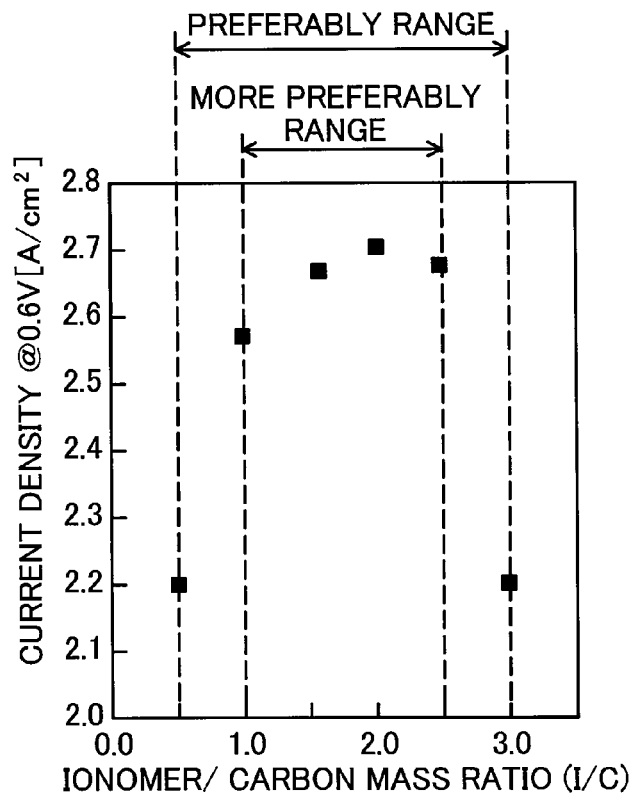
FIG. 16 is a diagram showing the relationship of the ionomer/carbon mass ratio to the current density.

FIG. 16 is a diagram showing the relationship of the ionomer/carbon mass ratio to the current density. In FIG. 16, the current density at the voltage of 0.6 V is plotted against the ionomer/carbon mass ratio (I/C) of the cathode catalyst layer 120 under the conditions that the length La of the carbon nanotubes 210 before compression is 40 [μm] and the inter-core pitch Pa of the carbon nanotubes 210 is 170 [nm]. The ionomer/carbon mass ratio in the range of not lower than 0.5 and not higher than 3.0 gives the current density of not lower than 2.0 [$A/cm^2$] at the voltage of 0.6 [V]. The ionomer/carbon mass ratio in the range of not lower than 1.0 and not higher than 2.5 gives the current density of not lower than 2.5 [$A/cm^2$] at the voltage of 0.6 [V]. Accordingly the ionomer/carbon mass ratio is preferably not lower than 0.5 and not higher than 3.0 and is more preferably not lower than 1.0 and not higher than 2.5.

Figure 17:
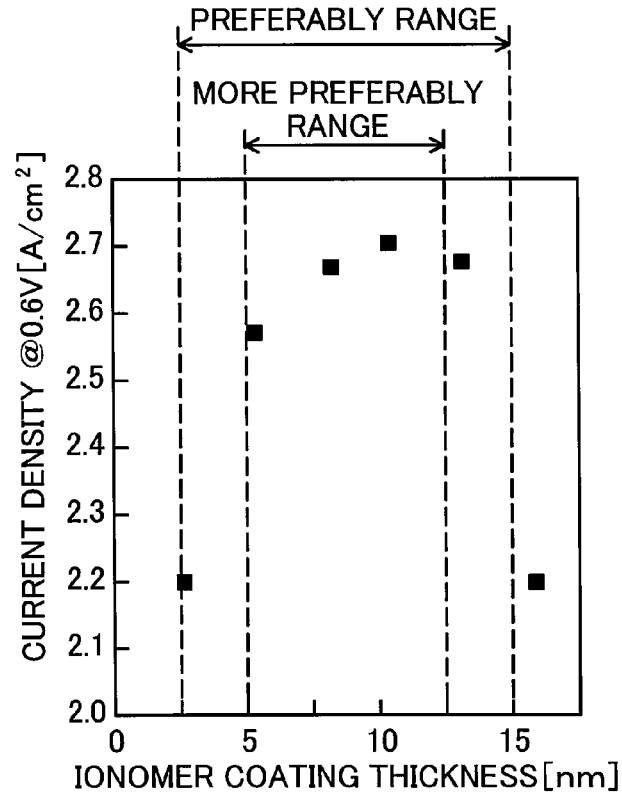
FIG. 17 is a diagram showing the relationship of the ionomer coating thickness of the carbon nanotubes to the current density.

FIG. 17 is a diagram showing the relationship of the ionomer coating thickness of the carbon nanotubes to the current density. In FIG. 17, the current density at the voltage of 0.6 V is plotted against the ionomer coating thickness of the cathode catalyst layer 120 under the conditions that the length La of the carbon nanotubes 210 before compression is 40 [μm] and the inter-core pitch Pa of the carbon nanotubes 210 is 170 [nm]. The ionomer coating thickness of no less than 2.5 [nm] and no more than 15 [nm] gives the current density of not lower than 2.0 [$A/cm^2$] at the voltage of 0.6 [V]. The ionomer coating thickness of no less than 5 [nm] and no more than 12.5 [nm] gives the current density of not lower than 2.5 [$A/cm^2$] at the voltage of 0.6 [V]. Accordingly the ionomer coating thickness is preferably no less than 2.5 [nm] and no more than 15 [nm] and is more preferably no less than 5 [nm] and no more than 12.5 [nm].

The following describes some aspects of the invention with reference to some embodiments. The embodiments of the invention described above are provided only for the purpose of facilitating the understanding of the invention and not for the purpose of limiting the invention in any sense. The invention may be changed, modified and altered without departing from the scope of the invention and includes equivalents thereof.

REFERENCE SIGNS LIST

10 . . . fuel cell
20 . . . carbon nanotube
100 . . . membrane electrode assembly
120 . . . cathode catalyst layer
130 . . . anode catalyst layer
140 . . . gas diffusion layer
160 . . . cathode separator pate
165 . . . groove
168 . . . surface
170 . . . anode separator plate
175 . . . groove
178 . . . surface
180 . . . frame
190 . . . spacer
200 . . . silicon substrate
210 . . . carbon nanotube
220 . . . platinum
230 . . . ionomer 250 . . . carbon particle
300 . . . measurement apparatus
310 . . . membrane
320 . . . working electrode
330 . . . counter electrode
340 . . . reference electrode
350 . . . gas chamber
360 . . . solution chamber
r . . . radius
W . . . mass
w . . . mass
SA . . . area
Pa . . . inter-core pitch
Sa . . . area
La . . . length
Nd . . . number density

The invention claimed is:

1. An electrode for fuel cell, comprising:
   (1) carbon nanotubes;
   (2) a catalyst for fuel cell supported on the carbon nanotubes, wherein the catalyst and carbon nanotubes form a catalyst layer; and
   (3) an ionomer coated on the carbon nanotubes and the catalyst for fuel cell,
   wherein when
      a length of the carbon nanotubes is represented by La um and
      an inter-core pitch of the carbon nanotubes is represented by Pa nm,
   the length La and the inter-core pitch Pa satisfy two expressions given below:

$30 \leq La \leq 240$;

$170 \leq Pa \leq 250$; and $0.611 \times La + 82.5 \leq Pa \leq 1.333 \times La + 190$; and wherein the carbon nanotubes joined with the electrolyte membrane by thermal pressure and the catalyst layer subsequently compressed to a thickness of no less than 7.5 um and no more than 17.5 um.

2. The electrode for fuel cell according to claim 1, wherein the length La and the inter-core pitch Pa satisfy an expression given below:

$0.78 \times La + 78 \leq Pa \leq 1.333 \times La + 150$.

3. The electrode for fuel cell according to claim 1, wherein the ionomer coats the carbon nanotubes in a thickness of no less than 2.5 nm and no more than 15 nm.

4. The electrode for fuel cell according to claim 3, wherein the ionomer coats the carbon nanotubes in a thickness of no less than 5 nm and no more than 12.5 nm.

5. The electrode for fuel cell according to claim 1, wherein
   the ionomer has solubility of oxygen that is higher than 10.9 mol/dm$^3$.

6. The electrode for fuel cell according to claim 5, wherein
   the ionomer has solubility of oxygen that is equal to or higher than 20 mol/dm$^3$.

7. The electrode for fuel cell according to claim 1, wherein
   the inter-core pitch Pa satisfies:

$30 \leq La \leq 210$.

8. The electrode for fuel cell according to claim 7, wherein
   the length La and the inter-core pitch Pa satisfy an expression given below:

$0.78 \times La + 78 \leq Pa \leq 1.333 \times La + 150$.

9. The electrode for fuel cell according to claim 7, wherein the ionomer coats the carbon nanotubes in a thickness of no less than 2.5 nm and no more than 15 nm.

10. The electrode for fuel cell according to claim 9, wherein the ionomer coats the carbon nanotubes in a thickness of no less than 5 nm and no more than 12.5 nm.

11. The electrode for fuel cell according to claim 7, wherein
    the ionomer has solubility of oxygen that is higher than 10.9 mol/dm$^3$.

12. The electrode for fuel cell according to claim 11, wherein
    the ionomer has solubility of oxygen that is equal to or higher than 20 mol/dm$^3$.

* * * * *